Fig. 1.

INVENTORS
Robert W. Irwin
Cornelius M. Herz

Patented Mar. 13, 1945

2,371,331

UNITED STATES PATENT OFFICE 2,371,331

VENEER JOINING MACHINE

Robert W. Irwin and Cornelius M. Herz, Grand Rapids, Mich.; said Herz assignor to said Irwin Application December 16, 1940, Serial No. 370,298

6 Claims. (Cl. 144—279)

This invention relates to improvements in veener joining machines.

This invention relates to machinery for joining pieces of veneer in edge abutting relationship. It has for its objects:

First, to provide a new and improved machine of the class described.

Second, to provide such a machine which may be used in joining the veneer pieces together in edge abutting relationship without the use of tape.

Third, to provide such a machine which is compact and relatively inexpensive to manufacture.

Fourth, to provide such a machine in which there are independently adjustable means for bringing the edges of the veneer into abutting relationship and for feeding the veener along so that the pressure exerted in forcing the veneers together by the various means may be controlled independently so as to provide the most desirable conditions for the setting of the glue and the joining of the pieces without having objectionable overlap of the pieces.

Fifth, to provide such a machine in which a plurality of bevel rollers are employed for pressing the pieces of veneer together, which rollers are independently adjustable so as to permit the desired pressure on the veneer pieces at all times during the passage of the pieces of veneer through the machine, which makes it possible to use a relatively short machine.

Sixth, to provide such a machine which is a combination taping and splicing machine by means of which it is possible to apply glue between the abutting edges of the veneer while at the same time applying a tape to the joint.

Seventh, to provide such a machine which may be used also as a taping machine as well as a splicing machine.

Eighth, to provide a machine which is easily and simply adjusted to take veneers of various types and sizes.

Ninth, to provide such a machine with a new and improved adhesive applicator.

Tenth, to provide such a machine having a new and improved glue applying means which is adjustable completely to control the amount of glue applied to the edges of the veneer so as to eliminate the formation of glue ridges at the joints.

Eleventh, to provide such a machine with an adhesive applicator which is extremely simple in construction and which may be removed as a unit from the machine for cleaning or repairing with a minimum of effort.

Further objects and advantages pertaining to details and economies of construction and operation will appear from the description to follow. The invention is defined in the claims. A preferred embodiment of our invention is illustrated in the accompanying drawings, in which:

The new and improved machine consists of a suitable base 1 on which is mounted a table 2 to receive the pieces of veneer and above which is provided a head 3.

Disposed at one end of the table is a guiding fin 4 which extends above the top of the table and against which the edges of the pieces of veneer are placed before feeding to the machine. Directly following this fin is the adhesive applying mechanism which is indicated generally at 5. This mechanism consists of a water bath container 6 which is fitted in an aperture 7 in the table top 2 over which the slidable removable top sections 8 extend. These top sections are separated centrally to form an aperture 9 for the glue applying disk 10.

The water bath container 6 is pivoted at one end on the shaft 11 and is vertically adjustable by means of a hand lever 12 which is pivoted at 121 to the container 6 and is pivoted between its ends at 13 to a bracket 131. A segment 132 is provided for this lever to hold the container in adjusted position.

A water overflow 14 is connected to the container 6. At the bottom of the container 6 is a thermostatically controlled electric heating unit 15 which keeps the water 16 in the container 6 at the desired temperature.

Fitted within the container 6 is the glue container 17 which has projecting flanges 18 which rest on shoulders 19 on the upper portion of the inner walls of the container 6. The container 17 extends down into the water bath 16 in the container 6 so that the glue 20 therein will be kept at the desired temperature. The disk 10 which projects above the table top to apply adhesive to the edges of the pieces of veneer is mounted on a shaft 21 which is journaled transversely of the container 17 and has a projecting end with a gear 22 fixed thereon which engages an idler gear 23 driven by the gear 231 on shaft 43. The idler gear 23 is journaled on the shaft 11 so that the drive from gear 231 to gear 22 will remain intact when the container 6, the supported glue pot 17 and the shaft 21 of the disk 10 are adjusted vertically by the pivotal movement of the container 6 around the shaft 11.

Figure 8:
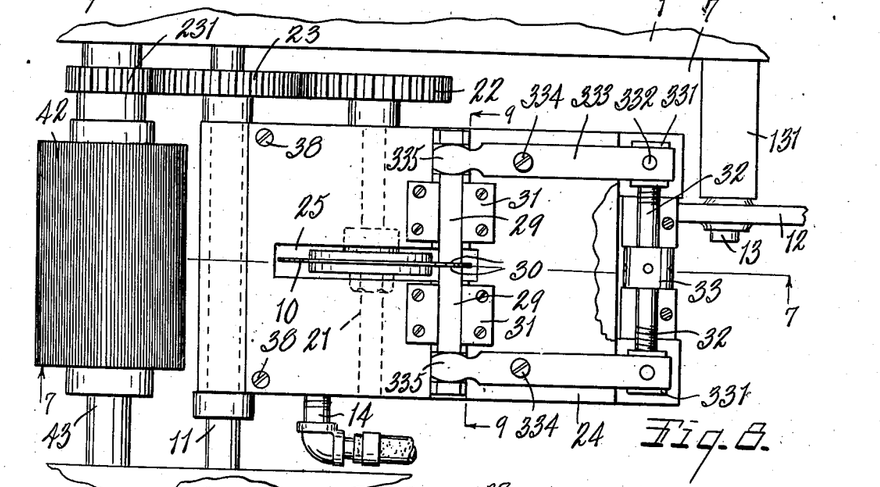
Fig. 8 is a detail plan view taken on line 8—8 of Fig. 7.
Figure 9:
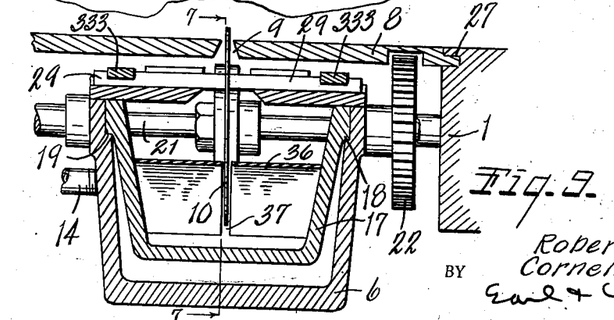
Fig. 9 is a detail sectional view of the adjustable means for controlling the amount of glue applied to the edges of the pieces of veneer, taken on line 9—9 of Fig. 8.

A cover 24 having a slot 25 which fits over the disk 10 is hinged on the pin 26 on the container 6 so that it can be swung from the position shown in Fig. 8 upwardly after removal of the removable top sections 8 which slide in ways 27 to a position to permit the container 17 with the disk 10, the shaft 21, and the gear 22 to be lifted bodily out of the container 6 for cleaning or repair. The gear 22 may be easily disengaged from the gear 23. By pivoting the container 6 and the supported glue pot and glue applying disk around the shaft 11 by means of the lever 12, it is possible to adjust the projection of the disk 10 above the table top to control the amount of glue applied to the veneers as they pass and contact the sides of the disk 10. The disk is raised to increase the amount of glue applied.

In order to further regulate the amount of glue applied by the disk 10 which is provided with a series of perforations 28 which pick up the glue 20 from the container 17, we provide adjustable wiper members 29 mounted on the cover 24. These members have the wiping edges 30 which lie parallel with the faces of the disk and are provided with ways 31 in which they slide and in which they are adjusted by means of right and left hand screws 32 which are provided with suitable spanner adjustment 33. These screws engage nuts 331 secured at 332 to levers 333 which are provided at 334 and have heads 335 engaging the wiper members 29. The position of the wiping edges serves to control the amount of glue carried by the disk 10 to the pieces of the veneer 34 which are fed along on opposite sides of but in contact with the disk 10.

By properly adjusting the elevation of the disk 10 and the position of the wiping edges 30 of the wiper members 29, a very accurate control of the amount of glue applied to the veneer pieces as they pass the disk 10 is obtained. It is possible by using the combined regulating means to make sure that when the pieces of veneer are urged together in edge abutting relationship, there will be no ridge of glue formed at the joint.

In operation the disk 10 is rotated at a speed either faster or slower than the speed of the veneer and in a counterclockwise direction as viewed in Fig. 8, so as to give a wiping action to spread the glue on the edges of the pieces of veneer.

Extending diagonally downwardly from the edge of the container 17 where it is anchored with a screw 35 is a baffle 36 which is slotted at 37 to fit over the disk 10. This baffle tends to clear glue from the disk 10 and to prevent it from piling up against the cover 24 of the gluing mechanism.

The means for feeding the veneer consist of a pair of driven knurled rolls 40 mounted below the table but with their circumferences substantially flush with the top thereof and in a position to engage the veneer as it passes thereover and also over rolls 41 and 42 similarly located below the table. The rolls 40 are driven by suitable drive shaft means 43.

In the head 3 are further knurled driving rolls 44, and 45 and 46 which are provided with sprockets 47 connected by chains 48. The drive for these rolls consists of a shaft 49 provided with a suitable universal joint connection 50 to the roll 44.

Mounted above the rolls 40 are a pair of toed-in rolls 51 which are journaled on shafts 52 in blocks 53 which are vertically slidable in ways 54 and are provided with rods 55 extending therefrom through apertures 56 where their heads are squared at 57 to permit adjustment. Springs 58 surrounding the rods 55 resiliently urge the blocks downwardly to provide a yielding or resilient mounting for the rollers 51. These rollers are adjusted to engage the pieces of veneer 34 and to hold them against the rolls 40 for feeding. Similarly mounted rolls 59 and 60 cooperate respectively with the rolls 41 and 42.

Beneath the table and disposed generally beneath the feed rolls 44, 45 and 46 are a series of bevel rolls 61, 62 and 63 whose beveled faces are knurled to engage the veneer pieces 34. The beveled faces of these rolls lie substantially in the plane of the table top 2 and the rolls are mounted on oblique shafts 64 in slidable blocks 65 so as to resiliently urge the veneer against the rolls 44, 45 and 46 through the action of compression springs 66 which are engaged by adjustable tappets 67 whose lower ends 68 are tapped to receive screws 69. The upward force of the rolls 61, 62 and 63 may be adjusted by lengthening or shortening the tappet 67 by screwing the screw 69 in or out of the tapped openings in their ends 68.

Below the table there is provided an adjustment for simultaneously controlling the tension of the rolls 61, 62 and 63 after their individual tensions have been balanced and adjusted. These consist of a series of levers 70 mounted on shafts 80 which have levers 81 on the ends thereof which are interconnected by a link 82. On one of the shafts 80, we provide a lever 83 for simultaneously turning all of the shafts 80 and we provide a segment 84 for this lever, the end 85 of which is easily accessible for adjustment at the front of the machine.

The tension exerted on the rolls 61, 62 and 63 against the veneer and thence against the rolls 44, 45 and 46 is a factor in determining the amount of pressure exerted by the rolls to force the pieces of veneer together. The adjustment can be made by adjusting the tappets 67 as above described and after the desired adjustment is obtained for individual rolls, the tension on all of the rolls may be simultaneously increased or decreased by making use of the lever 83.

To adjust the beveled rolls 61, 62 and 63 independently longitudinally of the table in order to also vary the force with which they force the pieces of veneer 34 together, each set of these rolls 61, 62 and 63 is mounted in a supporting member 86 which has projecting fins 87 slidable in ways 88. The supporting member 86 may be anchored in adjusted position by means of set screws 89 which bear against the fins 87 to clamp them. When the rolls 61, 62 and 63 are disposed directly below the rolls 44, 45 and 46, they exert practically no force tending to force the pieces of veneer together, but if the beveled rolls 61, 62 and 63, or any of them, are moved to the right as viewed in Fig. 2, they will exert more force to press the pieces of veneer together. The amount of force depends upon the relative positioning of the rolls 61, 62 and 63 to the right as viewed in this Fig. 2.

In order to make the machine suitable either for a tapeless joiner or for the use of veneer tape, means for raising the rolls 44 and 45 independently of the roll 46 are provided and for also raising the roll 46. We mount rolls 44 and 45 on a vertically movable supporting member 90 and the rolls 46 are mounted on a similarly vertical movable member 91. These members 90 and 91 are slidably supported by the head 3 for independent vertical movement. Pins 92 extend through the member 90 and pins 93 extend through the member 91 and their ends project and engage respectively cam slots 94 and 95 in the slides 96 which are slidable longitudinally of the machine by means of a lever 97 pivoted to the slides 96 at 98 by means of a slot 99 and to a fixed support 100. An operating rod 101 extends to the front of the machine from a pivotal connection 102 at the free end of this lever.

Figure 1:
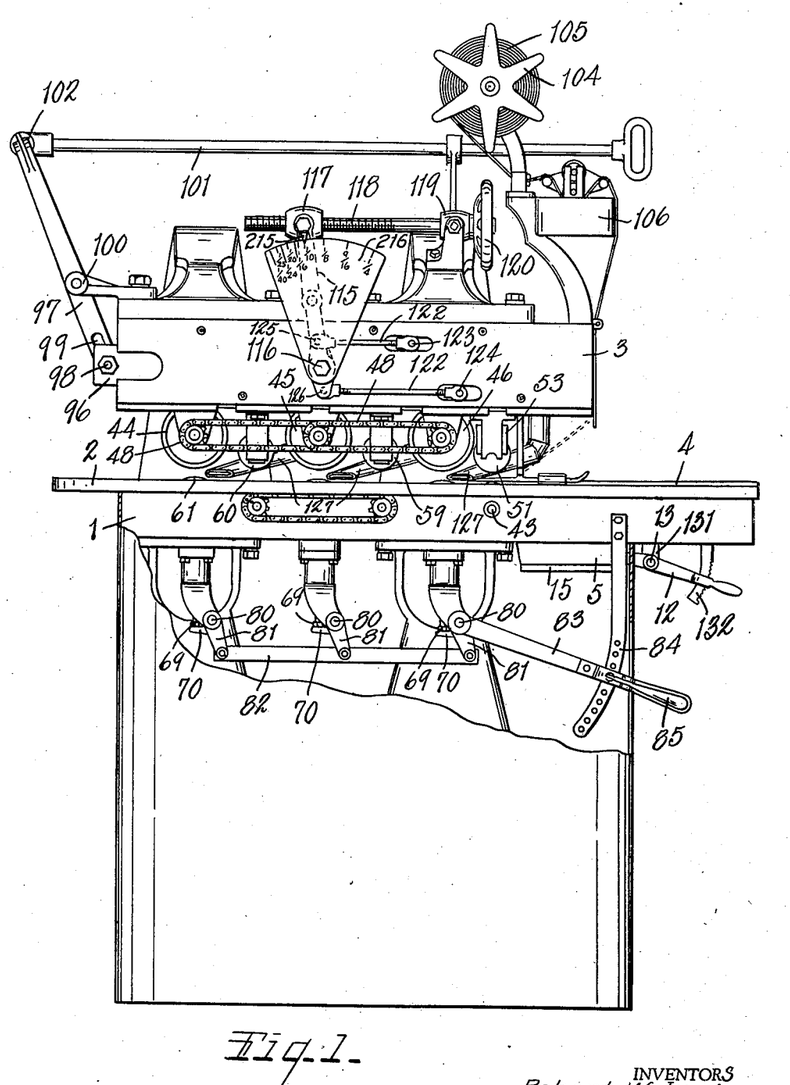
Fig. 1 is a side elevational view of a machine suitable for carrying out the new and improved process and embodying the invention hereof.
Figure 2:
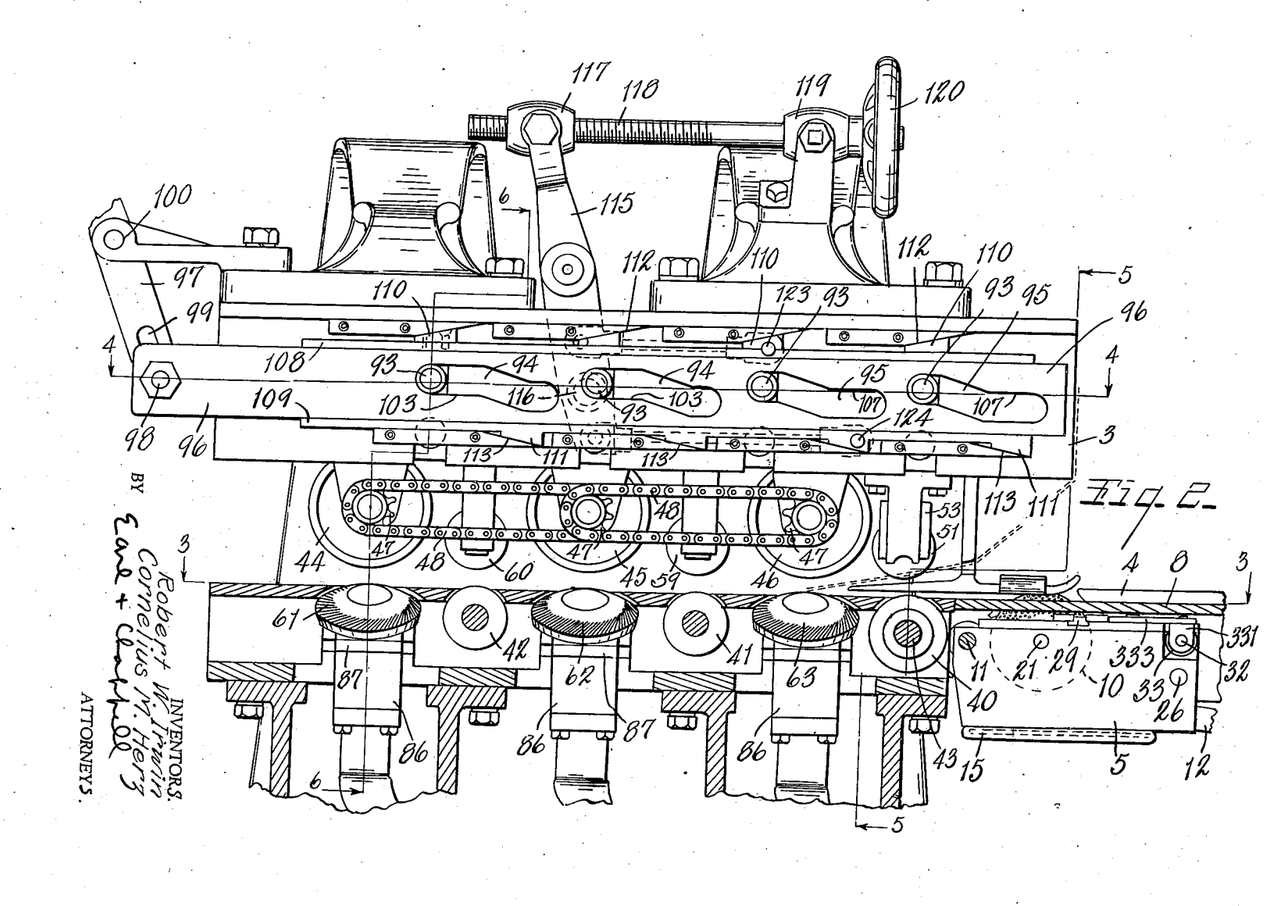
Fig. 2 is a detail sectional view of a portion of a machine shown in Fig. 1, taken on the line 2—2 of Fig. 4, showing the arrangement of the mechanism for feeding the pieces of veneer and for urging them into contact in order to assure adequate and quick setting of the adhesive.
Figure 3:
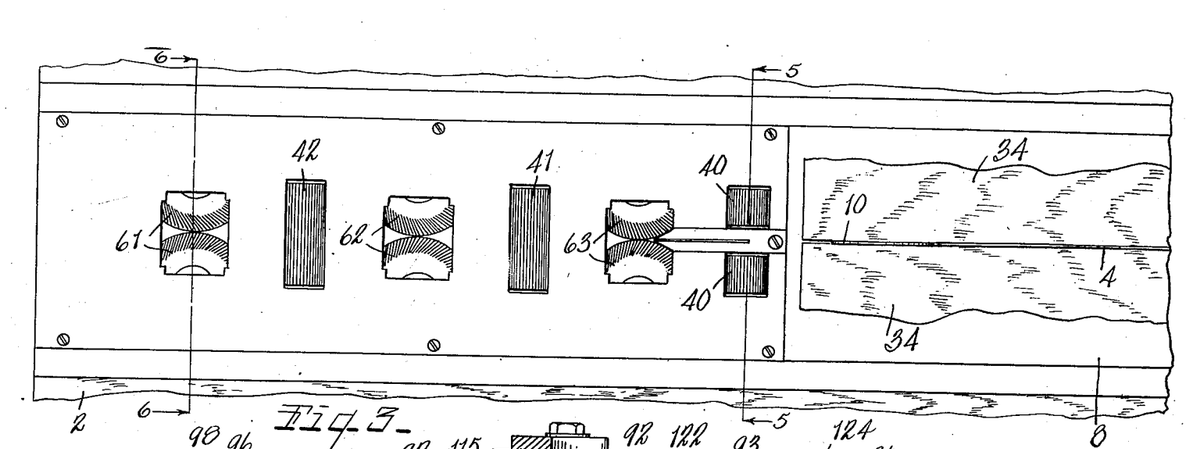
Fig. 3 is a detail sectional view taken on the line 3—3 of Fig. 2.
Figure 4:
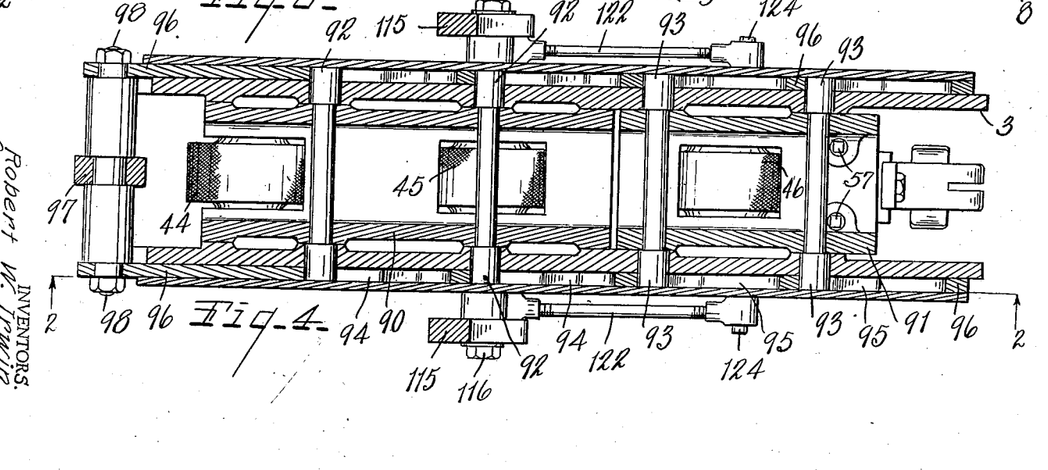
Fig. 4 is a detail sectional view taken on the line 4—4 of Fig. 2.
Figures 5, 10:
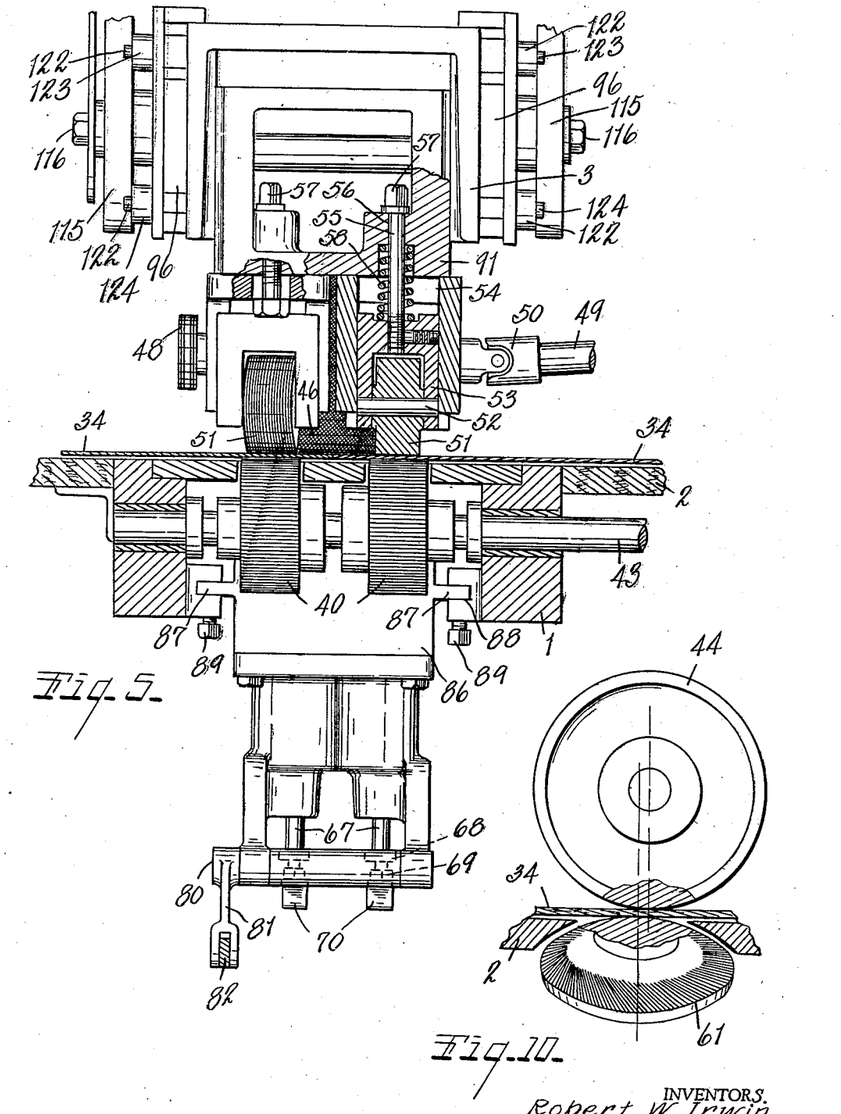
Fig. 5 is a detail sectional view taken on the line 5—5 of Figs. 2 and 3.
Fig. 10 is a detail view in section showing the arrangement of the feed and bevel rolls for pressing the edges of the pieces of veneer together as they are fed and after the adhesive has been applied.
Figures 6, 11:
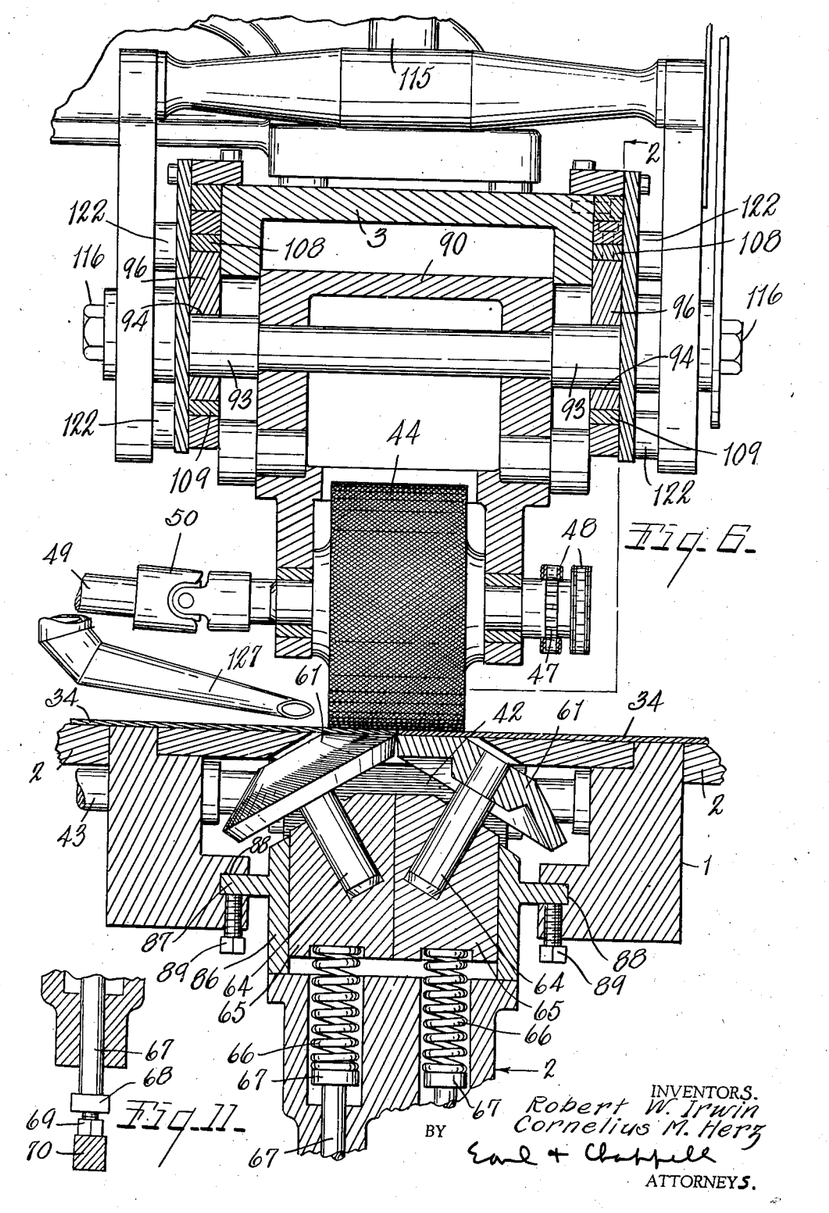
Fig. 6 is a detail sectional view taken on the line 6—6 of Figs. 2 and 3.
Fig. 11 is a detail view in section showing the adjustment for adjusting the tension of the bevel rolls above mentioned.
Figure 7:
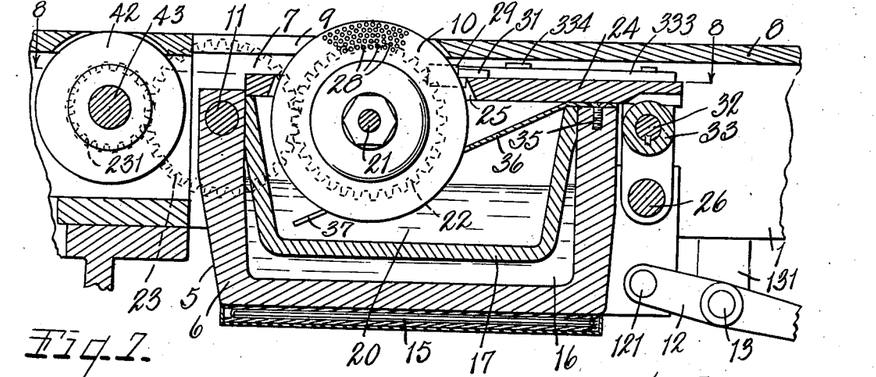
Fig. 7 is a detail sectional view taken on the line 7—7 of Figs. 8 and 9.

The cam slots 94 and 95 are generally the same and when the slides 96 are moved completely to the right as viewed in Fig. 2, the supporting members 90 and 91 are raised to the position shown in Fig. 2. By moving the operating rod 101 to the right, the slides 96 are moved to the left. The cam slots 94 are provided with dwells 103 so that during the first part of the movement of the slide 96 to the left, there is no change in position of the supporting member 90. The cam slots 95 slant down in such a way, however, that during the early part of the movement of the slides 96 to the left, the supporting member 91 moves downwardly and the downward movement is completed before any downward movement of the supporting member 90, which is retained by the dwells 103 in the position shown in Fig. 2.

When the machine is in this position with the roll 46 down in position to cooperate with the beveled roll 63, the machine may be used as a veneer taping machine. To make this possible, we provide a suitable mounting 104 for a roll 105 of veneer tape which passes through a suitable moistener or adhesive pot 106 and thence downwardly to the point of application to the veneer as in a conventional veneer taping machine.

In many instances, it is desirable to both tape and splice the veneer pieces to provide a tight joint between the veneers when they are applied to a suitable base. The machine is capable of both splicing and taping by making use of the above described glue applying disk and its associated mechanism and at the same time making use of the above described tape applying mechanism. When the two mechanisms are used simultaneously, the abutting edges of the veneer are joined by the glue applied by the disk and the veneer tape serves to firmly hold the pieces together during application to a base. The machine makes it possible to eliminate a dual operation which has been required heretofore in which the taping of the veneer was followed by a bending of the tape to expose the abutting edges of the pieces of veneer to glue applying means, after which the pieces joined by the tape were placed in the same plane. The tape in this operation served as a hinge and also as means for holding the veneers together after the application of glue to the edges. This dual operation is eliminated by the present machine and it can be carried out either with all of the rolls down in driving engagement, or with merely the first rolls down, as described, when the machine is employed for applying tape alone to the pieces of veneer.

If it is desired to use the machine as a tapeless joiner, the slides 96 are moved completely to the left. Because of the downward slanting portion of the cam slots 94, the supporting member 90 and the rolls 44 and 45 move down into position to cooperate with the beveled rolls 61 and 62. During this final movement, the dwells 107 in the cam slots 95 serve to keep the roll 46 and its supporting member 91 in position to cooperate with the beveled roll 63.

In order to adjust the machine for different thicknesses of veneer, we provide adjusting means suitable for adjusting the position of rolls 44, 45 and 46 simultaneously or for adjusting the position of the roll 46 when the rolls 44 and 45 are raised. The slide 96 is supported between slides 108 and 109 which carry respectively inclined cams 110 and 111 which have the same angle but which incline in opposite directions. The cams 110 and 111 engage respectively the inclined members 112 and 113 which are mounted on the head 3 and which incline in opposite directions and hold the slides 96 positively at the desired vertical adjustment.

In order to raise or lower the slides 96 and thereby adjust the elevation of the rollers 44, 45 and 46, the slides 108 and 109 are moved in opposite directions. When the slide 108 is moved to the left as viewed in Fig. 2 and the slide 109 to the right, the slides 96 are lowered and a reverse movement raises them. The slides 108 and 109 are actuated by a lever 115 which is pivoted at 116 at a point equally spaced between the slides 108 and 109. At its upper end the lever 115 carries a pivoted nut 117 to engage a screw 118 which is rotatably mounted against axial movement in a pivoted bearing 119. The screw 118 is adjusted by a hand wheel 120 which is easily accessible from the front of the machine. Links 122 are pivoted respectively at 123 and 124 to the slides 108 and 109 and have their other ends pivoted respectively at 125 and 126 to the lever 115 at points equally spaced above and below the pivot 116. Secured to the upper end of lever 115 is a pointer 215 adapted to move over a graduated plate 216 to indicate the degree of adjustment of the upper rolls above the table top for different thicknesses of veneer.

In operating the machine as a tapeless veneer joiner, all of the rolls 44, 45 and 46 are lowered into position to cooperate with the rolls 61, 62 and 63 and the rolls 51, 59 and 60 are also placed in cooperative relationship with the rolls 40, 41 and 42. The pieces 34 of veneer are placed on opposite sides of the fin 4 and are moved forwardly with their edges engaging opposite sides of the disk 10 which is revolving to spread the applied glue, the amount of which is controlled as above described by adjusting the edges 30 of the wipers 29, and by adjusting the elevation of the disk 10. The pieces of veneer are moved forward past the disk 10 until they are engaged by the rolls 40 and 51 which then feed them forward. They are next engaged by the rolls 46 and 63 followed by the rolls 59 and 41, 45 and 62, 60 and 42, and 44 and 61 in order.

By the use of this machine, it is possible to create a tight, well bonded joint between the pieces of veneer and it is possible to eliminate overlapping of the veneer during the gluing operation because of the independent adjustment of the bevel rolls to vary the pressure exerted by them to force the pieces of veneer together. As the pieces of veneer enter the machine, they are separated by the disk 10 so that they are convergingly approaching one another. The fact that the pieces of veneer are converging toward one another causes them to tend to overlap when they meet. By providing the independently adjustable rolls for urging the pieces together, it is possible in a great measure to overcome this tendency toward overlapping since the pressure exerted by each set of rolls can be adjusted to such a point that the pieces of veneer are urged together with the greatest possible pressure, short of that which will cause overlapping. It is possible, because of this arrangement, to provide a very compact machine with a minimum number of sets of rollers spaced a minimum distance apart. The gluing operation may be carried on very expeditiously with this machine, the size of which is at a minimum. The effect of this arrangement in the machine is that of varying the angularity between the pieces of veneer, so as to eliminate the tendency to overlap which results from the converging of these pieces as they enter the machine.

When it is desired to use the machine as a veneer taping machine, the slide 96 is moved to an intermediate position so that the cross pins 92 rest in the dwells 103 of the cam slots 94 and the pins 93 in the dwells 107 of the cam 95. When the slide 96 is in this position, the rolls 44 and 45 are raised and the roll 46 is lowered into position to cooperate with the roll 63. The veneer tape 105 from the supply roll 104 is then brought down and under the rollers 46 as in conventional taping machines. By employing the apparatus and method here described, it is possible to obtain highly satisfactory results for commercial veneering. In a very short space of travel, two pieces of veneer can be joined with a bond sufficiently strong to stand the handling incident to commercial veneering operations. The machine is very compact and contains a few parts. For certain types of veneer it may be used as a taping machine, making it unnecessary to have both a tapeless joiner and a taping machine. The machine may be easily adjusted and may be controlled by the operator from the front of the machine.

It is preferable in this machine to employ a glue which is kept liquid by the application of heat thereto and when such glue is employed, the setting thereof can be expedited by the application of cold air through air jets 127 which are directed at the joint at spaces between the rollers. By such an arrangement, using chilled or refrigerated air, it is possible to keep the length of the machine at a minimum and to expedite the gluing process.

The terms and expressions which have been herein employed are used as terms of description and not of limitation, and there is no intention, in the use of such terms and expressions, of excluding any equivalents of the features shown and described, or portions thereof. It is recognized that various modifications are possible within the scope of the invention claimed.

Having thus described our invention, what we claim as new and desire to secure by Letters Patent is:

1. In an apparatus of the class described, a table having a head thereabove, means at one end of the table for applying glue to the edges of veneers as they are fed beneath the head, a plurality of sets of beveled rolls disposed on inclined axes, the rollers of each set having their beveled edges substantially in the plane of the table top to engage veneers as they pass beneath said head and to urge said veneers together, means for adjusting said sets of beveled rolls independently along the line of movement of said veneers, and means for simultaneously adjusting said beveled rolls vertically to increase their pressure against the bottom of the veneers as they are fed, lower feed rolls disposed between said beveled rolls along the line of movement of said veneers, upper feed rolls mounted in said head and generally above said beveled rolls, and pressure rolls disposed on said head above said lower feed rolls and in cooperative relationship thereon, and means for raising all the rolls in the head with certain of said rolls raised independently of the first upper feed roll, and means on said head for supplying veneer tape to veneers as they pass beneath said first feed roll.

2. In an apparatus of the class described, a table having a head thereabove, means at one end of the table for applying glue to the edges of veneers as they are fed beneath the head, a plurality of sets of beveled rolls disposed on inclined axes, the rollers of each set having their beveled edges substantially in the plane of the table top to engage veneers as they pass beneath said head and to urge said veneers together, means for adjusting said sets of beveled rolls independently along the line of movement of said veneers, means for adjusting said beveled rolls vertically to increase their pressure against the bottom of the veneers as they are fed, lower feed rolls disposed between said beveled rolls along the line of movement of said veneers, upper feed rolls mounted in said head and generally above said beveled rolls, and pressure rolls disposed on said head above said lower feed rolls and in cooperative relationship thereto, means for raising all the rolls in the head with certain of said rolls raised independently of the first upper feed roll, and means on said head for supplying veneer tape to veneers as they pass beneath said first feed roll.

3. In an apparatus of the class described, a table having a head thereabove, means at one end of the table for applying glue to the edges of veneers as they are fed beneath the head, a plurality of sets of beveled rolls disposed on inclined axes, the rollers of each set having their beveled edges substantially in the plane of the table top to engage veneers as they pass beneath said head and to urge said veneers together, means for adjusting said sets of beveled rolls independently along the line of movement of said veneers, and means for simultaneously adjusting said beveled rolls vertically to increase their pressure against the bottom of the veneers as they are fed, upper feed rolls mounted in said head and generally above said beveled rolls, and means for raising all the rolls in the head with certain of said rolls raised independently of the first upper feed roll, and means on said head for supplying veneer tape to veneers as they pass beneath said first feed roll.

4. In an apparatus of the class described, a table having a head thereabove, a plurality of sets of beveled rolls disposed on inclined axes, the rollers of each set having their beveled edges substantially in the plane of the table top to engage veneers as they pass beneath said head and to urge said veneers together, means for adjusting said sets of beveled rolls independently along the line of movement of said veneers, and means for adjusting said beveled rolls vertically to increase their pressure against the bottom of the veneers as they are fed, upper feed rolls mounted in said head and generally above said beveled rolls, and means for raising all the rolls in the head with certain of said rolls raised independently of the first upper feed roll, and means on said head for supplying veneer tape to veneers as they pass beneath said first feed roll.

5. In an apparatus of the class described, a table having a head thereabove, means for feeding veneers beneath said head and suitable for applying veneer tape to said veneers, means for supplying veneer tape to said feeding means, means at one end of the table to apply glue to the edges of the veneers as they are fed beneath said head, and feeding means beyond said first feeding means adapted to feed veneers and force them together in edge abutting relationship, said last feeding means being adjustable independently of said first feeding means to be moved out of operative veneer engaging position.

6. In an apparatus of the class described, a table having a head thereabove, means at one end of the table for applying glue to the edges of veneers as they are fed beneath the head comprising rotatable disk dipping in a glue pot and having means for raising and lowering said disk and for scraping the edges thereof, a plurality of sets of beveled rolls disposed on inclined axes and having their beveled edges substantially in the plane of the table top to engage veneers as they pass beneath said head and to urge said veneers together, means for adjusting said beveled rolls independently along the line of movement of said veneers, and means for simultaneously adjusting said beveled rolls vertically to increase their pressure against the bottom of the veneers as they are fed, lower feed rolls disposed between said beveled rolls along the line of movement of said veneers, upper feed rolls mounted in said head and generally above said beveled rolls, and pressure rolls disposed on said head above said lower feed rolls and in cooperative relationship thereon, and means for raising all the rolls in the head with certain of said rolls raised independently of the first upper feed roll, and means on said head for supplying veneer tape to veneers as they pass beneath said first feed roll, and means for jetting cold air at the veneer joint between said sets of rollers.

ROBERT W. IRWIN.
CORNELIUS M. HERZ.